(12) United States Patent
Hong

(10) Patent No.: US 10,338,715 B2
(45) Date of Patent: Jul. 2, 2019

(54) ARRAY SUBSTRATE FOR TOUCH DISPLAY DEVICE AND METHOD OF FABRICATING THE SAME

(71) Applicant: LG Display Co., Ltd., Seoul (KR)

(72) Inventor: Hyun-Seok Hong, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/823,446

(22) Filed: Nov. 27, 2017

(65) Prior Publication Data

US 2018/0150167 A1 May 31, 2018

(30) Foreign Application Priority Data

Nov. 29, 2016 (KR) ........................ 10-2016-0160293

(51) Int. Cl.
*G06F 3/041* (2006.01)
*G06F 3/044* (2006.01)
*G06F 3/047* (2006.01)

(52) U.S. Cl.
CPC ............ *G06F 3/0412* (2013.01); *G06F 3/044* (2013.01); *G06F 3/047* (2013.01); *G06F 2203/04103* (2013.01); *G06F 2203/04112* (2013.01); *G09G 2310/0264* (2013.01)

(58) Field of Classification Search
CPC . G06F 2203/04103; G06F 2203/04112; G06F 3/0412; G06F 3/044; G06F 3/047; G09G 2310/0264
See application file for complete search history.

(56) References Cited

U.S. PATENT DOCUMENTS

| | | | |
|---|---|---|---|
| 2017/0003775 A1* | 1/2017 | Hu | ........................ G06F 3/044 |
| 2017/0045984 A1* | 2/2017 | Lu | ........................ G06F 3/044 |
| 2017/0255308 A1* | 9/2017 | Li | ..................... G02F 1/133345 |

* cited by examiner

*Primary Examiner* — Dmitriy Bolotin
(74) *Attorney, Agent, or Firm* — Fenwick & West LLP

(57) ABSTRACT

An array substrate for a touch display device includes: a substrate having a pixel region; a thin film transistor on the substrate in the pixel region; a planarizing layer on the thin film transistor; a touch common line on the planarizing layer; a first passivation layer on the touch common line, the first passivation layer having a touch common contact hole exposing the touch common line; a touch common electrode on the first passivation layer in the pixel region, the touch common electrode contacting the touch common line through the touch common contact hole; a second passivation layer on the touch common electrode; and a pixel electrode on the second passivation layer, the pixel electrode connected to the thin film transistor.

10 Claims, 7 Drawing Sheets

ARRAY SUBSTRATE FOR TOUCH DISPLAY DEVICE AND METHOD OF FABRICATING THE SAME

CROSS-REFERENCE TO RELATED APPLICATIONS

This patent application claims the benefit under 35 U.S.C. § 119(a) of Republic of Korea Patent Application No. 10-2016-0160293, filed on Nov. 29, 2016, in the Korean Intellectual Property Office, which is incorporated herein by reference in its entirety.

BACKGROUND

Technical Field

The present disclosure relates to an array substrate for a touch display device, and more particularly, to an array substrate for a touch display device where a yield is improved by preventing deterioration of a contact portion of a touch common line and a touch common electrode and a method of fabricating the array substrate.

Discussion of the Related Art

As an information society progresses, display devices have rapidly advanced and various flat panel displays (FPDs) have been developed. For example, the FPDs include a liquid crystal display (LCD) device, a plasma display panel (PDP) device, an organic light emitting diode (OLED) display device and a field emission display (FED) device. Since the FPDs have advantages such as a thin profile, a light weight and a low power consumption, cathode ray tube (CRT) devices have been widely substituted by the FPDs.

Recently, a touch display device where a touch panel is disposed over a display panel has been a subject of research. The touch display device is used as an output unit displaying an image and as an input unit receiving an order of a user by a touch of a specific portion of the image. The touch panel may be classified into a pressure sensing type, a capacitance type, an infrared type and an ultrasonic type according to a sensing type.

When a user watches the image displayed by the display panel and touches the touch panel, the touch panel detects a position information of the corresponding portion and recognizes an order of the user by comparing the detected position information with a position information of the image.

The touch display device may be fabricated such that an individual touch panel is attached to a display panel. Recently, for slimness of a portable terminal such as a smart phone and a tablet PC, a demand for an in-cell touch display device where a touch panel and a display panel are integrated by using an electrode or a line for the display panel as an electrode and a line for a display panel has increased.

FIG. 1 is a cross-sectional view showing an array substrate for an in-cell touch display device according to the related art.

In FIG. 1, an array substrate for an in-cell touch display device according to the related art includes a touch common electrode 42, a touch common line TL and a pixel electrode 52.

A gate insulating layer 24, a first insulating layer 32 and a planarizing layer 34 are sequentially formed over an entire surface of a substrate 20, and a touch common electrode 42 is formed on the planarizing layer 34 in a pixel region.

A first passivation layer 38 is formed on the touch common electrode 42 over an entire surface of the substrate 20, and a touch common line TL is formed on the first passivation layer 38 in the pixel region. The first passivation layer 38 has a touch common contact hole 40 exposing the touch common electrode 42, and the touch common line TL is connected to the touch common electrode 42 through the touch common contact hole 40.

A second passivation layer 44 is formed on the touch common line TL over an entire surface of the substrate 20, and a pixel electrode 52 is formed on the second passivation layer in the pixel region.

The touch common electrode 42 has a plate shape, and the pixel electrode 52 has a shape of a plurality of bars separated from each other.

The array substrate for the in-cell touch display device may display an image using the pixel electrode 52 and the touch common electrode 42 and may sense a touch using the touch common electrode 42.

The touch common line TL is connected to the touch common electrode 42 through the touch common contact hole 40 of the first passivation layer 38. For example, after the touch common electrode 42 is formed, the first passivation layer 38 may be formed on an entire surface of the substrate 20, and the touch common contact hole 40 may be formed in the first passivation layer 38. In addition, the touch common line TL is formed on the first passivation layer 38 having the touch common contact hole 40.

The touch common contact hole 40 of the first passivation layer 38 may be formed through a photolithographic process. For example, a photoresist layer is formed on the first passivation layer over an entire surface of the substrate 20, and an exposure step is performed to the photoresist layer through a photo mask. A development step is performed to the exposed photoresist layer to form a photoresist pattern, and the first passivation layer 38 is etched using the photoresist pattern as an etching mask. The photoresist pattern on the etched first passivation layer 38 is removed through a stripping step to form the touch common contact hole 40 in the first passivation layer 38.

Since the touch common electrode 42 exposed through the touch common contact hole 40 is formed of indium tin oxide (ITO) including oxygen, the photoresist pattern is not completely removed and a residual photoresist remains on the touch common electrode 42 and at periphery of the touch common contact hole 40.

The residual photoresist abates an adhesive strength between the touch common line TL and the touch common electrode 42 and an adhesive strength between the touch common line TL and the first passivation layer 38. As a result, a stress is generated in the touch common line TL, the first passivation layer 38 and the touch common electrode 42 due to a heat in a subsequent step of forming the second passivation layer 44. Accordingly, the touch common line TL in and at periphery of the touch common contact hole 40 may be detached from the first passivation layer 38 and the touch common electrode 42. Further, the first passivation layer 38 may be detached from the touch common electrode 42 and a yield of the touch display device is reduced.

The array substrate includes a storage capacitor using the touch common line TL, the first and second passivation layers 38 and 44 and a layer the same as the pixel electrode 52 as a first capacitor electrode, a dielectric layer and a second capacitor electrode, respectively. For improving an image displaying property by increasing a capacitance of the storage capacitor, a thickness of the first and second passivation layers 38 and 44 is required to be reduced. However, when the thickness of the second passivation layer 44 is reduced, an initial parasitic capacitance between the touch common line TL and the adjacent touch common line TL increases and a touch sensing property is deteriorated.

Accordingly, improvement of both of the image displaying property and the touch sensing property is not obtained.

SUMMARY

Embodiments relate to an array substrate for a touch display device where a residual photoresist is prevented and a yield is improved by connecting a touch common electrode to a touch common line through a touch common contact hole and a method of fabricating the array substrate.

One or more embodiments relate to an array substrate for a touch display device where an initial parasitic capacitance is reduced and a touch sensing property and an image displaying property are improved by forming a relatively thick first passivation layer between a touch common line and a touch common electrode and forming a relatively thin second passivation layer between the touch common electrode and a pixel electrode and a method of fabricating the array substrate.

Advantages and features of the disclosure will be set forth in the description, which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

It is to be understood that both the foregoing general description and the following detailed description are explanatory, and are intended to provide further explanation of the embodiments as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

DETAILED DESCRIPTION

Figure 1:
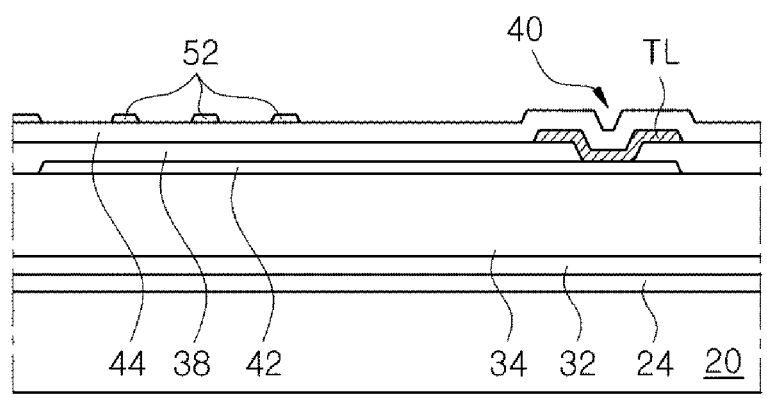
FIG. 1 is a cross-sectional view showing an array substrate for an in-cell touch display device according to the related art.

Reference will now be made in detail to embodiments of the present disclosure, examples of which are illustrated in the accompanying drawings. In the following description, when a detailed description of well-known functions or configurations related to this document is determined to unnecessarily cloud a gist of an embodiment of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
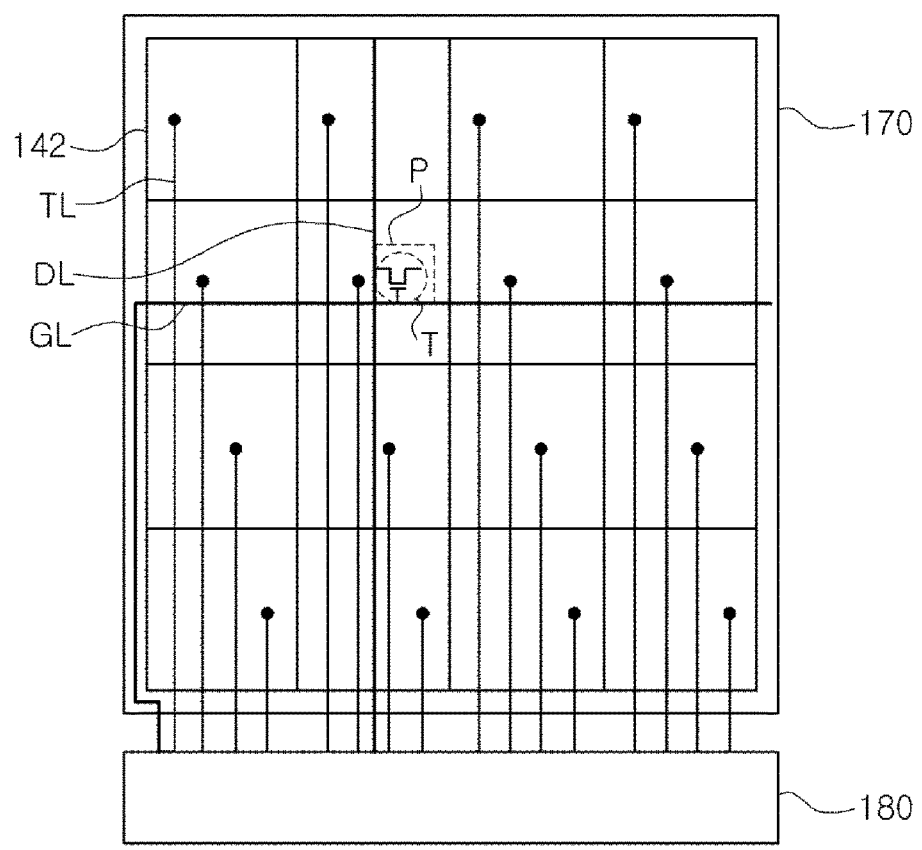
FIG. 2 is a plan view showing an in-cell touch display device according to an embodiment of the present disclosure.

FIG. 2 is a plan view showing an in-cell touch display device according to an embodiment of the present disclosure. Specifically, a self capacitance type in-cell touch display device is exemplarily illustrated.

In FIG. 2, a self capacitance type in-cell touch display device 110 according to an embodiment of the present disclosure includes a touch display panel 170 and a driving unit 180.

The touch display panel 170 may display an image and may sense a touch using a signal for displaying an image and a signal for sensing a touch supplied by the driving unit 180. The touch display panel 170 includes a central display area displaying an image and sensing a touch and a peripheral non-display area where a plurality of pads are formed.

The touch display panel 170 may include a first substrate 120 (of FIG. 3) and a second substrate (not shown) facing and spaced apart from each other and a liquid crystal layer (not shown) between the first substrate 120 and the second substrate.

A plurality of gate lines GL and a plurality of data lines DL crossing each other to define a plurality of pixel regions P are formed on the first substrate 120, and a thin film transistor (TFT) T connected to the gate line GL and the data line DL is formed in each of the plurality of pixel regions P.

A touch common electrode 142 is formed on the TFT T in each of the plurality of pixel regions P, and a pixel electrode 152 (of FIG. 3) connected to the TFT T is formed on the touch common electrode 142 in each of the plurality of pixel regions P.

The first substrate 120 may include a plurality of blocks each having one to ninety nine pixel regions P. The touch common electrodes 142 in one to ninety nine pixel regions P of each block are electrically connected to each other, and the touch common electrodes 142 of different blocks are electrically separated from each other.

The touch common electrode 142 of each block is independently connected to the driving unit 180 through the touch common line TL, and the touch common line TL may overlap the data line DL to be parallel to the data line DL.

The driving unit 180 generates a signal for displaying an image and a signal for sensing a touch and supplies the signal for displaying an image and the signal for sensing a touch to the touch display panel 170. The touch display panel 170 receives a touch sensing signal and senses a touch.

For example, the driving unit 180 may generate a gate voltage, a data voltage and a common voltage as a signal for displaying an image and may supply the gate voltage, the data voltage and the common voltage to the gate line GL, the data line DL and the touch common electrode 142, respectively, of the touch display panel 170. The touch display panel 170 may display an image using the gate voltage, the data voltage and the common voltage.

The driving unit 180 may detect a touch sensing voltage of the touch common electrode 142 of the touch display panel 170 and may sense a touch by analyzing a change of a capacitance from the touch sensing voltage. The image displaying and the touch sensing may be performed through a time division method.

In the touch display device 110, since the touch common electrode 142 contacts the touch common line TL through the touch common contact hole 140 (of FIG. 3), a residue of a photoresist of a step of forming a touch common contact hole 140 is prevented and an adhesive strength of the touch common electrode 142 and the touch common line TL is reinforced. As a result, deterioration such as detachment is prevented and a yield is improved.

In addition, since a first passivation layer 138 (of FIG. 3) between the touch common line TL and the touch common electrode 142 is formed to have a relatively great thickness, an initial parasitic capacitance is reduced and a touch sensing property is improved. Further, since a second passivation layer 144 (of FIG. 3) between the touch common electrode 142 and the pixel electrode 152 is formed to have a relatively small thickness, a capacitance of a storage capacitor increases and a property of displaying an image is improved.

Figure 3:
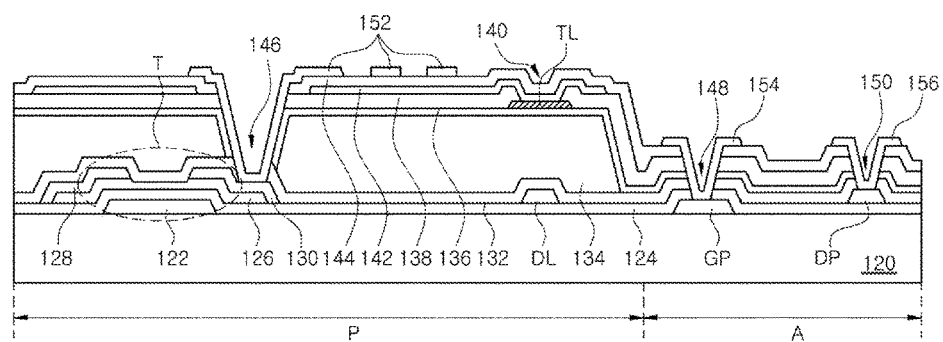
FIG. 3 is a cross-sectional view showing an array substrate for an in-cell touch display device according to an embodiment of the present disclosure.

FIG. 3 is a cross-sectional view showing an array substrate for an in-cell touch display device according to an embodiment of the present disclosure.

In FIG. 3, an array substrate for an in-cell touch display device according to an embodiment of the present disclosure includes a plurality of pixel regions P of a display area and a pad region A of a non-display area.

A gate electrode 122 and a gate pad GP are formed on a first substrate 120 in the pixel region P and the pad region A, respectively, and a gate insulating layer 124 is formed on the gate electrode 122 and the gate pad GP over an entire surface of the first substrate 120.

A plurality of gate lines GL are formed on the first substrate 120, and the gate electrode 122 is connected to the gate line GL. An end portion of each gate line GL is connected to the gate pad GP.

The gate electrode 122, the gate line GL and the gate pad GP may be formed of the same layer and the same material as each other.

A semiconductor layer 126 is formed on the gate insulating layer 124 corresponding to the gate electrode 122, and a source electrode 128 and a drain electrode 130 spaced apart from each other are formed on the semiconductor layer 126.

A plurality of data lines DL crossing the plurality of gate lines GL are formed on the gate insulating layer 124, a data pad DP is formed on the gate insulating layer 124 in the pad region A. The source electrode 128 is connected to the data line DL, and an end portion of each data line DL is connected to the data pad DP.

The source electrode 128, the drain electrode 130, the data line DL and the data pad DP may be formed of the same layer and the same material as each other.

The gate electrode 128, the semiconductor layer 126, the source electrode 128 and the drain electrode 130 constitute a thin film transistor (TFT) T.

A first insulating layer 132 is formed on the TFT T, the data line DL and the data pad DP over an entire surface of the first substrate 120, a planarizing layer 134 having an opening is formed on the first insulating layer 132 in the display area, and a second insulating layer 136 is formed on the planarizing layer 134 over an entire surface of the first substrate 120.

The planarizing layer 134 may be formed of an organic insulating material such as photo acryl, and the first and second insulating layers 132 and 136 may be formed of an inorganic insulating material such as silicon oxide (SiO$_2$) and silicon nitride (SiNx). An adhesive strength of the planarizing layer 134 and upper and lower metallic material layers is improved by the first and second insulating layers 132 and 136. In another embodiment where a problem of an adhesive strength is not caused, the first and second insulating layers 132 and 136 may be omitted.

A touch common line TL is formed on the second insulating layer 136 in the pixel region P, and a first passivation layer 138 is formed on the touch common line TL over an entire surface of the first substrate 120.

The touch common line TL may be formed of a metallic material such as aluminum (Al). The touch common line TL is disposed to be parallel to the data line DL. For example, the touch common line TL may be disposed to overlap the data line DL with the first insulating layer 132, the planarizing layer 134 and the second insulating layer 136 interposed therebetween.

The first passivation layer 138 has a touch common contact hole 140 exposing the touch common line TL.

A touch common electrode 142 is formed on the first passivation layer 138 in each pixel region P, and a second passivation layer 144 is formed on the touch common electrode 142 over an entire surface of the first substrate 120.

The touch common electrode 142 may be formed of a transparent conductive material such as indium tin oxide (ITO) and may have a plate shape. The first and second passivation layers 138 and 144 may be formed of an inorganic insulating material such as silicon oxide (SiO$_2$), silicon nitride (SiNx) and silicon oxynitride (SiON).

The first and second insulating layers 132 and 136 and the first and second passivation layers 138 and 144 have a drain contact hole 146 exposing the drain electrode 130 and a data pad contact hole 150 exposing the data pad DP. The gate insulating layer 124, the first and second insulating layers 132 and 136 and the first and second passivation layers 138 and 144 have a gate pad contact hole 148 exposing the gate pad GP.

A pixel electrode 152 is formed on the second passivation layer 144 in each pixel region P, and a gate pad terminal 154 and a data pad terminal 156 are formed on the second passivation layer 144 corresponding to the gate pad GP and the data pad DP, respectively, in the pad region A.

The pixel electrode 152 is connected to the drain electrode 130 through the drain contact hole 146, the gate pad terminal is connected to the gate pad GP through the gate pad contact hole 148, and the data pad terminal 156 is connected to the data pad DP through the data pad contact hole 150.

The pixel electrode 152 may be formed of a transparent conductive material such as indium tin oxide and may have a shape of a plurality of bars spaced apart from each other.

The pixel electrode 152, the gate pad terminal 154 and the data pad terminal 156 may have the same layer and the same material as each other.

In the array substrate for a touch display device, the first passivation layer 138 having the touch common contact hole 140 exposing the touch common line TL is formed on the touch common line TL, and the touch common electrode 142 is formed on the first passivation layer 138. Since the touch common electrode 142 contacts the touch common line TL through the touch common contact hole 140, a residual photoresist in the step of forming the touch common contact hole 140 is prevented and an adhesive strength of the touch common electrode 142 and the touch common line TL is reinforced. As a result, deterioration such as detachment is prevented and a yield increases.

Although not shown, the array substrate for a touch display device includes a storage capacitor where the touch common electrode 142, the second passivation layer 144 and a layer the same as the pixel electrode 152 are used as a first capacitor electrode, a dielectric layer and a second capacitor electrode, respectively. Since the second passivation layer 144 is formed to have a relatively small thickness, a capacitance of the storage capacitor increases and a property of displaying an image is improved.

Since an initial parasitic capacitance between the touch common line TL and the adjacent touch common line TL is determined by the first passivation layer 138 regardless of the second passivation layer 144, the initial parasitic capacitance between the touch common line TL and the adjacent touch common line TL is reduced without reduction of a capacitance of the storage capacitor by forming the first passivation layer 138 to have a relatively great thickness. As a result, a property of sensing a touch is improved.

For example, the first and second passivation layers 138 and 144 may be formed such that a thickness of the first passivation layer 138 is greater than a thickness of the second passivation layer 144.

FIGS. 4A to 4I are cross-sectional views showing a method of fabricating an array substrate for an in-cell touch display device according to an embodiment of the present disclosure.

Figure 4A:
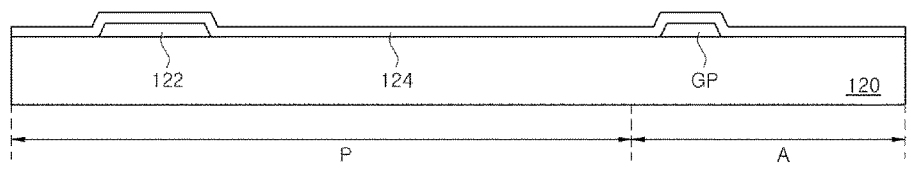
FIGS. 4A to 4I are cross-sectional views showing a method of fabricating an array substrate for an in-cell touch display device according to an embodiment of the present disclosure.

In FIG. 4A, a gate electrode 122 and a gate pad GP are formed on a first substrate 120 in a pixel region P and a pad region A, respectively, and a gate line GL connected to the gate electrode 122 is formed on the first substrate 120. Next, a gate insulating layer 124 is formed on the gate electrode 122 and the gate pad GP over an entire surface of the first substrate 120.

Figure 4B:
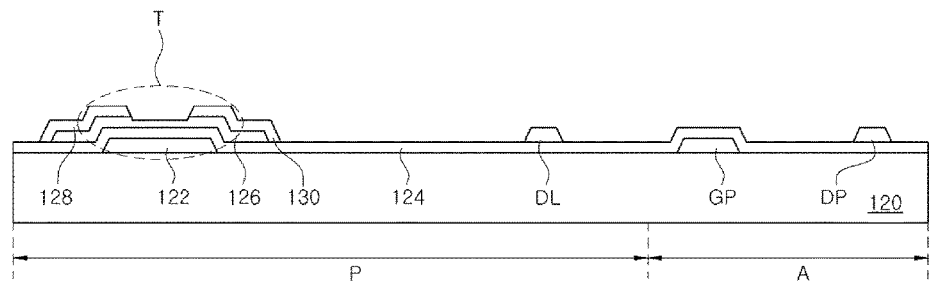

In FIG. 4B, a semiconductor layer 126 is formed on the gate insulating layer 124 corresponding to the gate electrode 122. Next, a source electrode 128 and a drain electrode 130 spaced apart from each other are formed on the semiconductor layer 126, a data line DL crossing the gate line GL is formed on the gate insulating layer 124, and a data pad DP is formed on the gate insulating layer 124 of the pad region A.

Here, the gate electrode 122, the semiconductor layer 126, the source electrode 128 and the drain electrode 130 constitute a thin film transistor (TFT) T.

Figure 4C:
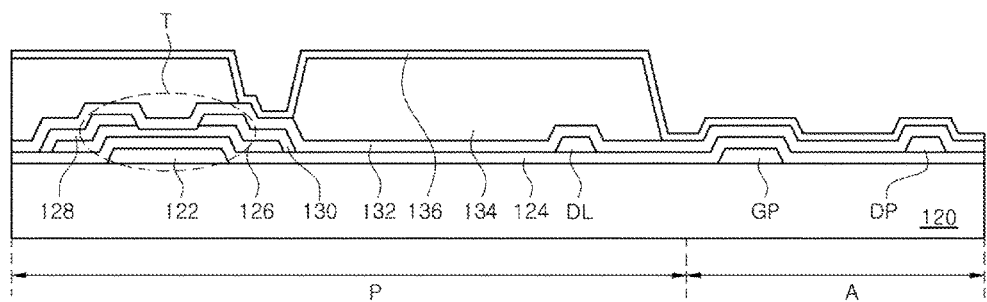

In FIG. 4C, a first insulating layer 132 is formed on the TFT T, the data line DL and the data pad DP over an entire surface of the first substrate 120. Next, a planarizing layer 134 having an opening is formed on the first insulating layer 132 of a display area. Next, a second insulating layer 136 is formed on the planarizing layer 134 over an entire surface of the first substrate 120.

The planarizing layer 134 may be formed of an organic insulating material such as photo acryl, and the first and second insulating layers 132 and 136 may be formed of an inorganic insulating material such as silicon oxide ($SiO_2$), silicon nitride (SiNx) and silicon oxynitride (SiON).

Figure 4D:
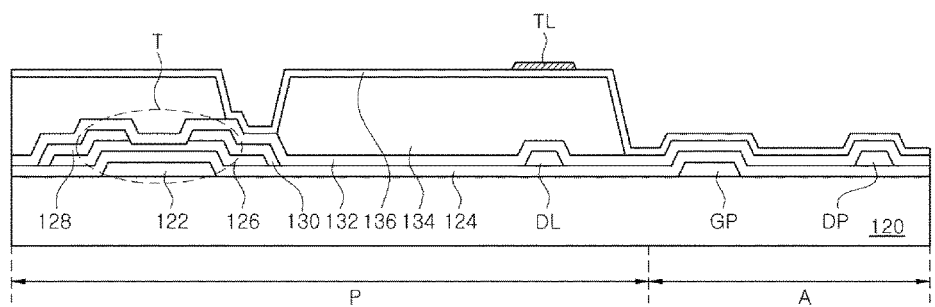

In FIG. 4D, a touch common line TL is formed on the second insulating layer 136 of the pixel region P.

The touch common line TL may be formed of a metallic material such as aluminum (Al). The touch common line TL is disposed to be parallel to the data line DL. For example, the touch common line TL may be disposed to overlap the data line DL with the first insulating layer 132, the planarizing layer 134 and the second insulating layer 136 interposed therebetween.

Figure 4E:
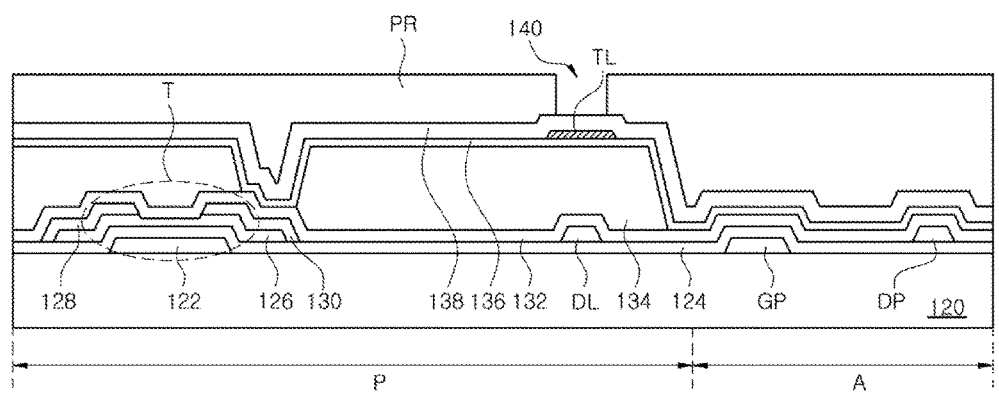

In FIG. 4E, a first passivation layer 138 is formed on the touch common line TL over an entire surface of the first substrate 120. Next, a photoresist pattern PR exposing the first passivation layer 138 corresponding to the touch common line TL is formed on the first passivation layer 138.

A photoresist layer (not shown) may be formed by coating a photoresist, the photoresist layer may be exposed to a light, and the exposed photoresist layer may be developed to form the photoresist pattern PR.

Figure 4F:
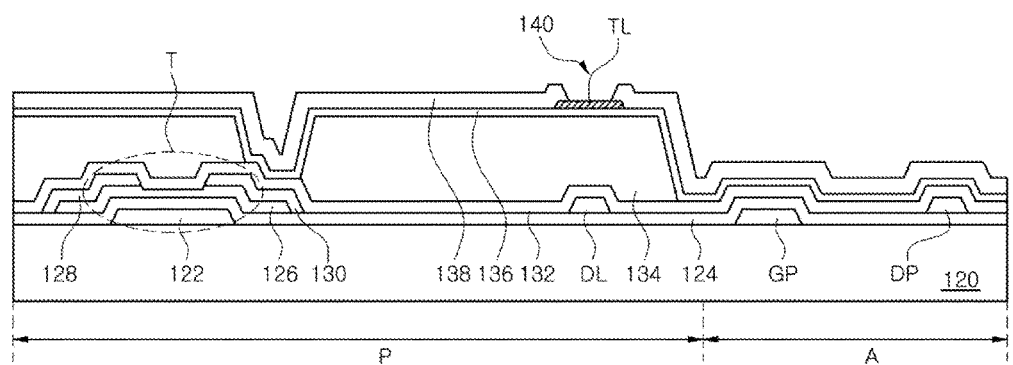

In FIG. 4F, a touch common contact hole 140 exposing the touch common line TL is formed in the first passivation layer by etching the first passivation layer 138 using the photoresist pattern PR as an etching mask.

Next, the photoresist pattern PR on the first passivation layer 138 is removed through a stripping process. Since the touch common line TL exposed through the touch common contact hole 140 is formed of a metallic material such as aluminum (Al), the photoresist pattern is completely removed and a residual photoresist does not remain on the touch common line TL or at periphery of the touch common contact hole 140.

Figure 4G:
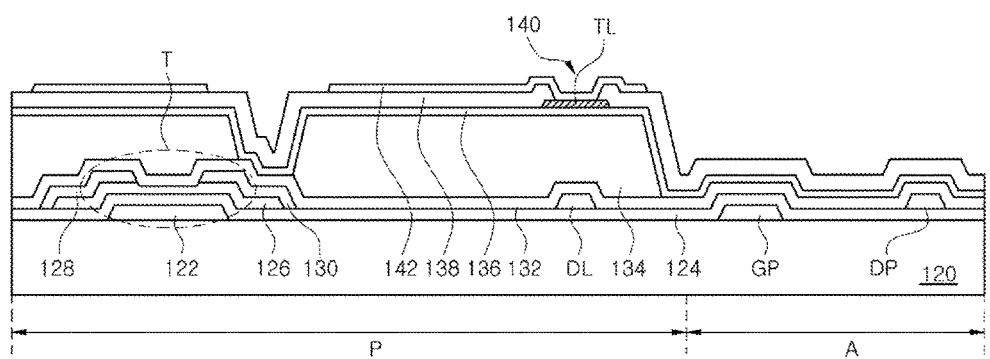

In FIG. 4G, a touch common electrode 142 is formed on the first passivation layer 138 in each pixel region P. The touch common electrode 142 is connected to the touch common line TL through the touch common contact hole 140.

Here, the touch common electrode 142 may be formed of a transparent conductive material such as indium tin oxide (ITO) and may have a plate shape. Since a residual photoresist is prevented on the touch common line TL or at periphery of the touch common contact hole 140 when the touch common contact hole 140 is formed, an adhesive strength between the touch common electrode 142 and the touch common line TL and an adhesive strength between the touch common electrode 142 and the first passivation layer 138 are reinforced.

Figure 4H:
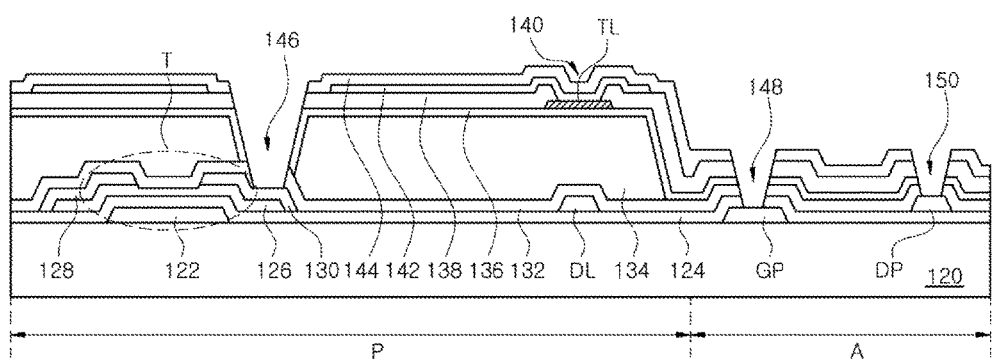

In FIG. 4H, a second passivation layer 144 is formed on the touch common electrode 142 over an entire surface of the first substrate 120. Next, a drain contact hole 146 exposing the drain electrode 130 and a data pad contact hole 150 exposing the data pad DP are formed in the first and second insulating layers 132 and 136 and the first and second passivation layers 138 and 144 through a photolithographic process. Further, a gate pad contact hole 148 exposing the gate pad GP is formed in the gate insulating layer 124, the first and second insulating layers 132 and 136 and the first and second passivation layers 138 and 144 through the photolithographic process.

Here, the first and second passivation layers 138 and 144 may be formed of an inorganic insulating material such as silicon oxide ($SiO_2$), silicon nitride (SiNx) and silicon oxynitride (SiON).

An adhesive strength between the touch common electrode 142 and the touch common line TL and an adhesive strength between the touch common electrode 142 and the first passivation layer 138 are reinforced. As a result, the touch common electrode 142 in the touch common contact hole 140 and at periphery of the touch common contact hole 140 is not detached from the first passivation layer 138 and the touch common line TL even when a stress is generated in the touch common line TL, the first passivation layer 138 and the touch common electrode 142 due to a heat in a step of forming the second passivation layer 144. Accordingly, deterioration such as detachment is prevented.

Figure 4I:
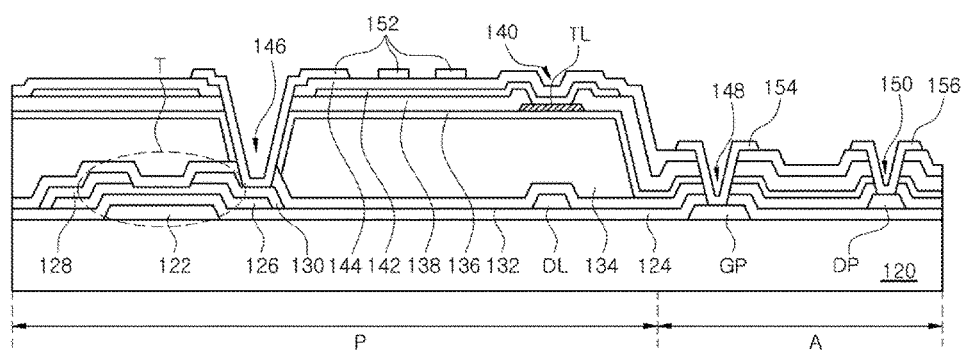

In FIG. 4I, a pixel electrode 152 is formed on the second passivation layer 144 in each pixel region P, and a gate pad terminal 154 and a data pad terminal 156 are formed on the second passivation layer 144 corresponding to the gate pad GP and the data pad DP, respectively, of the pad region A.

The pixel electrode 152 is connected to the drain electrode 130 through the drain contact hole 146, the gate pad terminal 154 is connected to the gate pad GP through the gate pad contact hole 148, and the data pad terminal 156 is connected to the data pad DP through the data pad contact hole 150.

The pixel electrode 152 may be formed of a transparent conductive material such as indium tin oxide (ITO) and may have a shape of a plurality of bars spaced apart from each other.

Although an in-cell touch liquid crystal display device is illustrated in the embodiment FIG. 3, an in-cell touch organic light emitting diode (OLED) display device may be used in another embodiment.

Consequently, in a method of fabricating an array substrate for a touch display device, after the first passivation layer 138 is formed on the touch common line TL of a metallic material and the photoresist pattern PR is formed on the first passivation layer 138, the first passivation layer 138 is patterned to form the touch common contact hole 140 and the photoresist pattern PR is removed. As a result, the photoresist pattern PR is completely removed and a residual photoresist does not remain on the touch common line TL or at periphery of the touch common contact hole 140. Accordingly, an adhesive strength of the touch common electrode 142 and the touch common line TL and an adhesive strength of the touch common electrode 142 and the first passivation layer 138 are reinforced and a yield increases by preventing deterioration such as detachment.

Further, the first passivation layer 138 having a relatively great thickness is formed between the touch common line TL and the touch common electrode 142, and the second passivation layer 144 having a relatively small thickness is formed between the touch common electrode 142 and the pixel electrode 152. As a result, a touch sensing property is improved due to reduction of an initial parasitic capacitance, and a property of displaying an image is improved due to increase of a capacitance of a storage capacitor.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An array substrate for a touch display device, comprising:
   a substrate having a pixel region;
   a thin film transistor on the substrate in the pixel region;
   a planarizing layer on the thin film transistor;
   a metallic touch common line on the planarizing layer;
   a first passivation layer on the touch common line, the first passivation layer having a touch common contact hole;
   a transparent touch common electrode on the first passivation layer in the pixel region, the transparent touch common electrode contacting the metallic touch common line through the touch common contact hole;
   a second passivation layer on the touch common electrode; and
   a pixel electrode on the second passivation layer, the pixel electrode connected to the thin film transistor,
   wherein the metallic touch common line is exposed by the touch common contact hole and whole area of the transparent touch common electrode are covered with the second passivation layer,
   wherein the transparent touch common electrode is formed in the touch common contact hole so that the transparent touch common electrode is directly connected to the metallic touch common line.

2. The array substrate of claim 1, wherein the planarizing layer includes an organic insulating material,
   where the first and second passivation layers include an inorganic insulating material, and
   wherein the pixel electrode include a transparent conductive material.

3. The array substrate of claim 1, wherein a thickness of the first passivation layer is greater than a thickness of the second passivation layer.

4. The array substrate of claim 1, wherein the substrate includes a plurality of blocks,
   wherein the transparent touch common electrodes in one of the plurality of blocks are electrically connected to each other, and
   wherein the transparent touch common electrodes in different ones of the plurality of blocks are electrically separated from each other.

5. The array substrate of claim 1, further comprising:
   a gate line a data line crossing each other to define the pixel region, the gate line and the data line connected to the thin film transistor;
   a gate pad connected to an end portion of the gate line; and
   a data pad connected to an end portion of the data line.

6. The array substrate of claim 5, wherein the touch common line is disposed to be parallel to the data line, and the touch common line overlaps the data line with the planarizing layer interposed therebetween.

7. A method of fabricating an array substrate for a touch display device, comprising:
   forming a thin film transistor on a substrate having a pixel region;
   forming a planarizing layer on the thin film transistor;
   forming a metallic touch common line on the planarizing layer;
   forming a first passivation layer on the metallic touch common line, the first passivation layer having a touch common contact hole exposing the metallic touch common line;
   forming a transparent touch common electrode on the first passivation layer in the pixel region, the transparent touch common electrode being formed in the touch common contact hole to contact the metallic touch common line through the touch common contact hole;
   forming a second passivation layer on an entire area of the touch common electrode; and
   forming a pixel electrode on the second passivation layer, the pixel electrode connected to the thin film transistor.

8. The method of claim 7, wherein the planarizing layer includes an organic insulating material,
   the first and second passivation layers including an inorganic insulating material, and
   wherein the pixel electrode include a transparent conductive material.

9. The method of claim 7, a thickness of the first passivation layer is greater than a thickness of the second passivation layer.

10. The method of claim 7, wherein forming the first passivation layer comprises:
    forming a photoresist pattern on the first passivation layer, the photoresist pattern exposing the first passivation layer corresponding to the touch common line;
    patterning the first passivation layer using the photoresist pattern as an etching mask; and
    removing the photoresist pattern.

* * * * *